March 26, 1929.  A. M. THOMSON  1,707,032
VIBRATION ABSORBER
Filed Feb. 10, 1925  2 Sheets-Sheet 1

INVENTOR
Alfred Morris Thomson
BY
Cipriano Andrade, Jr.
ATTORNEY

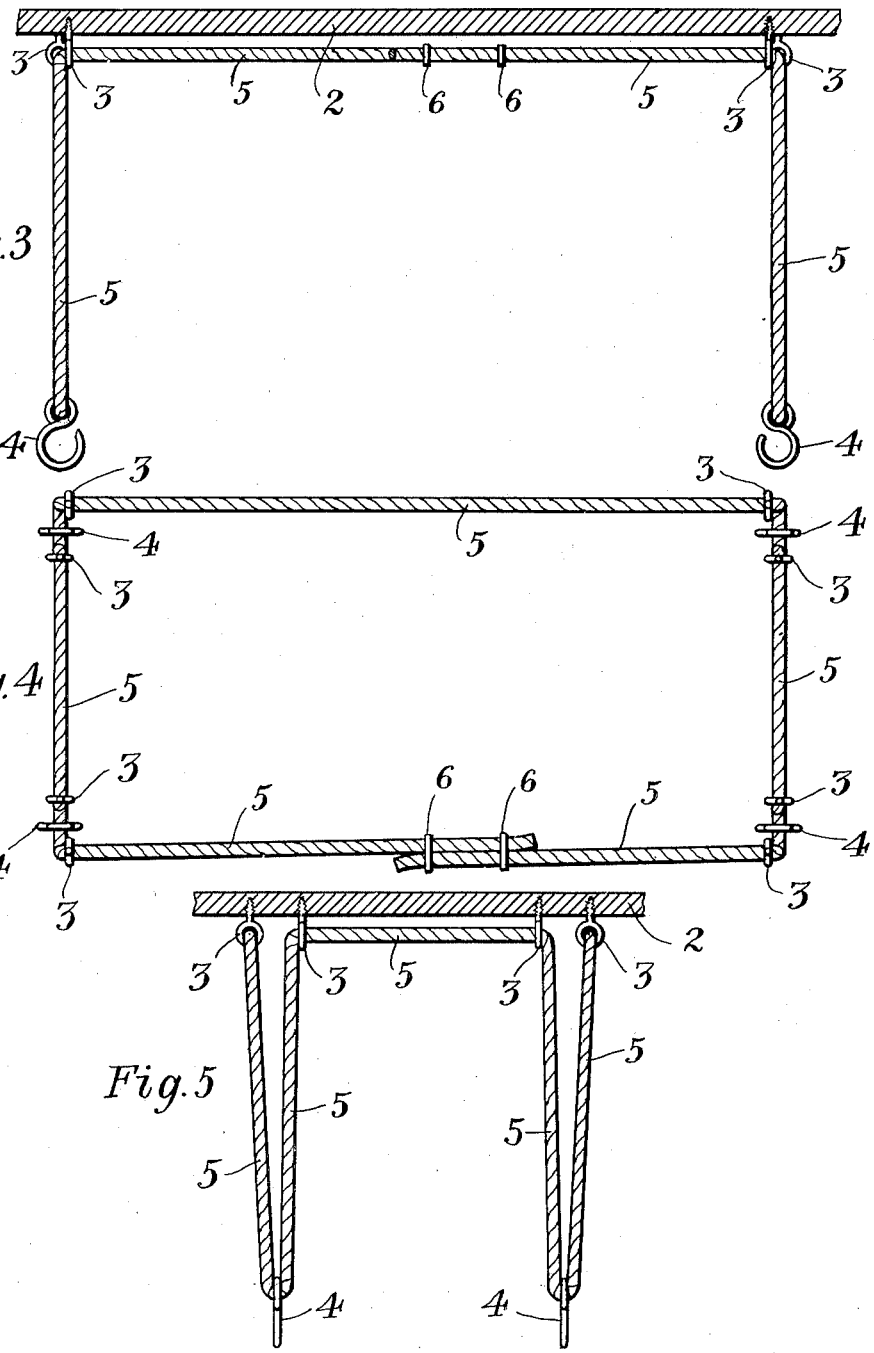

Patented Mar. 26, 1929.

1,707,032

UNITED STATES PATENT OFFICE.

ALFRED MORRIS THOMSON, OF NEWARK, NEW JERSEY, ASSIGNOR TO JOSEPH MERCADANTE, OF NEW YORK, N. Y.

VIBRATION ABSORBER.

Application filed February 10, 1925. Serial No. 8,092.

My invention relates to vibration absorbers to absorb the vibration and eliminate the noise of motors and other power transmitting devices.

Figure 1:
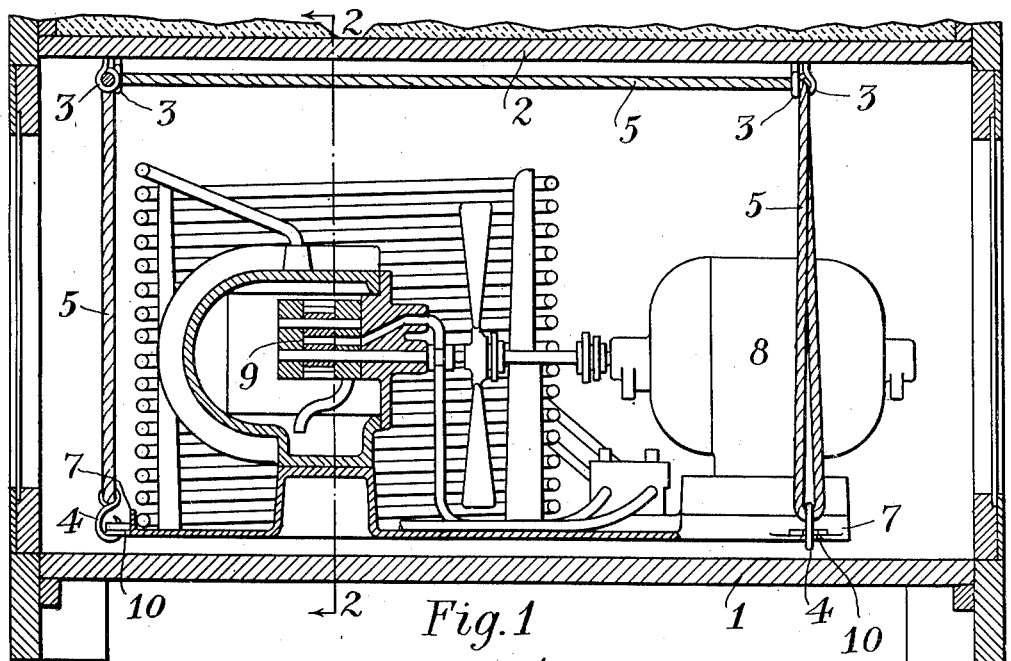
Figure 2:
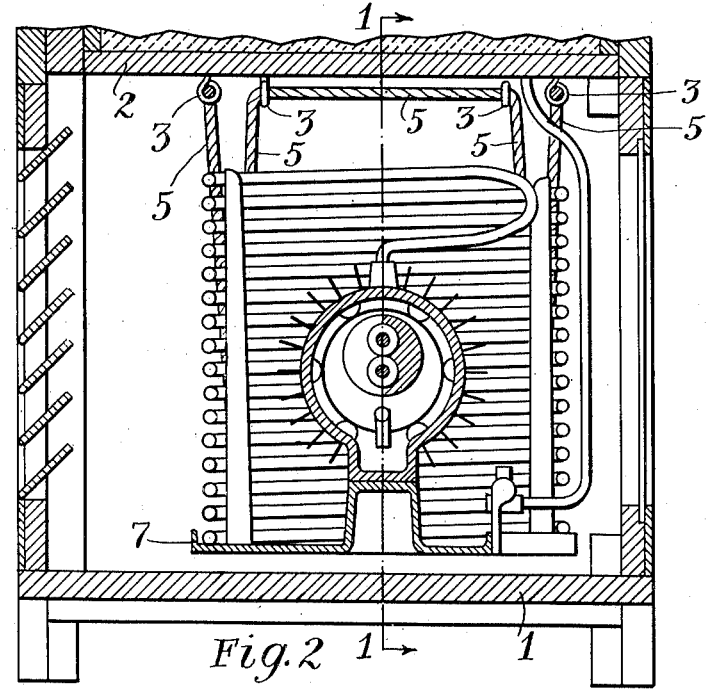

I attain this object by the mechanism illustrated in the accompanying drawings, in which:

Fig. 1 is a sectional side-view of my applied device taken on section line 1—1 of Fig. 2; Fig. 2 is a sectional end-view of my applied device taken on section line 2—2 of Fig. 1; Fig. 3 is a side view of my device detached from the mechanically operated structure which it supports; Fig. 4 is a top view of Fig. 3; and Fig. 5 is an end view of Fig. 3.

Similar numerals refer to similar parts throughout the several views.

1 is a solid floor, which is usually adapted to support a motor or other power transmitting device, such for example as electric motor 8 and rotary pump 9, solidly connected to base 7. The particular device illustrated by said parts 7, 8 and 9 and the unnumbered parts thereto attached represent an electric refrigerating apparatus, but it will be understood that the invention hereby disclosed is not limited to the support of an electric refrigerating apparatus. 2 is an upper roof, to which are attached screw-eyes 3. 4 are hooks let into holes 10 in base 7. 5 is a rope which connects screw-eyes 3 and hooks 4. It will be understood that the word "rope" as used in the specifications and claims hereof means an ordinary cord or rope of hemp, cotton, or other suitable material. 6 are clasps adapted to hold the adjacent ends of rope 5 in firm contact.

The operation of my device is as follows:

After placing screw-eyes 3 in position, rope 5 is led through screw-eyes 3 and hooks 4 as shown, and then the ends of rope 5 are securely fastened by clasps 6 or other appropriate means. Hooks 4 are then put into holes 10 in base 7. When thus assembled, the entire vibration of motor 8 and pump 9 is absorbed by the elasticity of rope 5, whether said vibration be transverse, longitudinal or vertical. This elimination of vibration, being achieved without any direct contact between the supporting screw-eyes 3 and the base 7, also eliminates the disagreeable noise which is quite common in other vibration absorbing devices.

A particular feature of the present invention resides in the fact that the base 7 is supported at a plurality of points by loops of rope, each of these loops comprising a section of a single integral piece of rope which passes horizontally along the upper roof 2 between these loops. The rope 5 passes freely through screw-eyes 3 and hooks 4, and for this reason, any vibrations of the base 7 due to the operation of the apparatus secured thereto, is transmitted to and absorbed by the entire length of the rope. Owing to the limited space available in the structure disclosed and in other similar structures, the length of a vertical flexible support which may be employed is rather limited, and with the arrangement of the present invention, the effective length of flexible rope available for the absorption of vibrations is very large in proportion to vertical space available.

I claim:

1. A vibration absorbing support comprising a supporting medium, a vibrating element to be supported thereby, and a single continuous length of elastic rope secured to said supporting medium and having a plurality of downwardly extending loops secured at their lower ends to points on more than one side of the base of said vibrating element.

2. A vibration absorbing support comprising a supporting medium, a single continuous length of elastic rope passing freely through openings in means secured at spaced points on said supporting medium, said rope extending downwardly in a plurality of loops between said means, and a vibratory element secured at points on more than one side thereof to the lower ends of said loops.

3. A vibration absorbing support comprising a supporting medium, a vibratory element to be supported thereby and a single continous length of rope passing freely through openings in means on said supporting medium and on opposite sides of said vibratory element, whereby said element is secured to said medium by a plurality of loops of said rope, and the vibrations of said elements are transmitted to the entire length of said rope.

4. A vibration absorbing support, comprising a supporting medium having a plurality of pairs of screw-eyes secured at spaced points on the lower surface thereof, a single continuous length of rope passing freely through all of said screw-eyes, said rope extending horizontally along said supporting medium between said pairs of screw-eyes and extending downwardly in spaced loops between the screw-eyes of each pair, and a vibratory element secured to the lower ends of said loops said several loops respectively engaging said vibratory element on opposite sides thereof, whereby the vibrations of said vibratory element are transmitted to and absorbed by the entire length of the rope.

ALFRED MORRIS THOMSON.